United States Patent [19]

Burgman et al.

[11] Patent Number: 5,709,950
[45] Date of Patent: Jan. 20, 1998

[54] COLOR-PLUS-CLEAR COMPOSITE COATINGS THAT CONTAIN POLYMERS HAVING CARBAMATE FUNCTIONALITY

[75] Inventors: John W. Burgman, Murrysville; Gina M. Terrago, Wexford; Christopher A. Verardi, Pittsburgh, all of Pa.

[73] Assignee: PPG Industries, Inc., Pittsburgh, Pa.

[21] Appl. No.: 770,196

[22] Filed: Dec. 19, 1996

Related U.S. Application Data

[63] Continuation-in-part of Ser. No. 586,053, Jan. 16, 1996, which is a continuation-in-part of Ser. No. 236,912, Apr. 29, 1994, abandoned.

[51] Int. Cl.$^6$ .................... C08L 61/32; C08L 71/08
[52] U.S. Cl. ............... 428/423.1; 428/423.7; 428/424.2; 428/480; 428/482; 428/483; 428/500; 428/515; 428/524; 525/406; 525/154; 525/157; 525/163
[58] Field of Search ............... 525/406, 154, 525/157, 163; 428/423.1, 423.7, 424.2, 480, 482, 483, 500, 515, 524

[56] References Cited

U.S. PATENT DOCUMENTS

| | | | |
|---|---|---|---|
| 3,366,613 | 1/1968 | Kelley | 260/89.5 |
| 3,464,938 | 9/1969 | Nordstrom | 260/21 |
| 3,479,328 | 11/1969 | Nordstrom | 260/86.1 |
| 3,813,254 | 5/1974 | Makhlouf | 117/12 |
| 3,880,796 | 4/1975 | Christenson et al. | 260/33.6 |
| 3,919,154 | 11/1975 | Chang et al. | 260/29.4 |
| 3,953,644 | 4/1976 | Camelon et al. | 428/220 |
| 3,966,667 | 6/1976 | Sullivan et al. | 260/33.6 |
| 4,055,607 | 10/1977 | Sullivan et al. | 260/851 |
| 4,110,286 | 8/1978 | Vandegaer et al. | 260/29.2 |
| 4,147,679 | 4/1979 | Scriven et al. | 260/29.2 |
| 4,147,688 | 4/1979 | Makhlouf et al. | 260/33.6 |
| 4,154,891 | 5/1979 | Porter, Jr. et al. | 428/334 |
| 4,180,489 | 12/1979 | Andrew et al. | 428/402 |
| 4,180,619 | 12/1979 | Makhlouf et al. | 526/202 |
| 4,220,679 | 9/1980 | Backhouse | 427/401 |
| 4,279,833 | 7/1981 | Culbertson et al. | 260/464 |
| 4,308,184 | 12/1981 | Thoma et al. | 260/29.2 |
| 4,403,003 | 9/1983 | Backhouse | 427/407.1 |
| 4,411,951 | 10/1983 | Barsotti | 428/328 |
| 4,416,941 | 11/1983 | Barsotti | 428/328 |
| 4,425,450 | 1/1984 | Horvath | 523/334 |
| 4,455,331 | 6/1984 | Barsotti | 428/446 |
| 4,477,618 | 10/1984 | Singer et al. | 524/157 |
| 4,518,724 | 5/1985 | Kuwajima et al. | 523/501 |
| 4,520,167 | 5/1985 | Blank et al. | 525/131 |
| 4,540,766 | 9/1985 | Chang et al. | 528/45 |
| 4,543,276 | 9/1985 | Parekh | 427/388.3 |
| 4,558,075 | 12/1985 | Suss et al. | 523/216 |
| 4,569,966 | 2/1986 | Piccirilli et al. | 524/589 |
| 4,620,993 | 11/1986 | Suss et al. | 427/407.1 |
| 4,624,973 | 11/1986 | Kuwajima et al. | 523/221 |
| 4,677,168 | 6/1987 | Hoy et al. | 525/441 |
| 4,681,811 | 7/1987 | Simpson et al. | 428/413 |
| 4,764,430 | 8/1988 | Blackburn et al. | 428/413 |
| 4,829,120 | 5/1989 | Yabuta | 524/460 |
| 4,913,972 | 4/1990 | Grunewalder et al. | 428/425.5 |
| 4,916,187 | 4/1990 | Goel | 525/109 |
| 4,927,868 | 5/1990 | Schimmel et al. | 523/439 |
| 4,965,317 | 10/1990 | Kania et al. | 525/155 |
| 5,025,060 | 6/1991 | Yabuta et al. | 524/533 |
| 5,053,463 | 10/1991 | Inoue | 525/427 |
| 5,071,904 | 12/1991 | Martin et al. | 524/458 |
| 5,077,347 | 12/1991 | Yabuta et al. | 524/504 |
| 5,098,947 | 3/1992 | Metzger et al. | 524/507 |
| 5,124,433 | 6/1992 | Inoue | 528/272 |
| 5,130,405 | 7/1992 | Walker et al. | 528/78 |
| 5,196,485 | 3/1993 | McMonigal et al. | 525/327.3 |
| 5,300,328 | 4/1994 | Rehfuss | 427/388.3 |
| 5,300,537 | 4/1994 | Muller et al. | 523/115 |
| 5,336,566 | 8/1994 | Rehfuss | 428/524 |
| 5,356,669 | 10/1994 | Rehfuss et al. | 427/407.1 |
| 5,356,670 | 10/1994 | Briggs et al. | 427/410 |
| 5,373,069 | 12/1994 | Rehfuss et al. | 525/456 |
| 5,374,682 | 12/1994 | Gouda et al. | 525/185 |
| 5,384,367 | 1/1995 | Swarup et al. | 525/169 |

(List continued on next page.)

FOREIGN PATENT DOCUMENTS

| | | |
|---|---|---|
| 0 211 359 | 2/1987 | European Pat. Off. . |
| 0 234 881 | 9/1987 | European Pat. Off. . |
| 0 257 848 | 3/1988 | European Pat. Off. . |
| 0 594 068 | 4/1994 | European Pat. Off. . |
| 0 594 142 | 4/1994 | European Pat. Off. . |
| 0 457 939 | 7/1994 | European Pat. Off. . |
| 0 605 963 | 7/1994 | European Pat. Off. . |
| 0 636 660 | 2/1995 | European Pat. Off. . |
| 0 697 400 | 2/1996 | European Pat. Off. . |
| 49-018126 | 2/1974 | Japan . |
| 51-4124 | 1/1976 | Japan . |
| 6-184073 | 7/1994 | Japan . |
| 96-59950 | 3/1996 | Japan . |
| WO 87/00851 | 2/1987 | WIPO . |
| WO 94/10211 | 5/1994 | WIPO . |
| WO 94/10212 | 5/1994 | WIPO . |
| WO 94/10213 | 5/1994 | WIPO . |

OTHER PUBLICATIONS

U.S. Ser. No. 08/770,195, filed Dec. 19, 1996 entitled *Flexible Aminoplast–Curable Film–Forming Compositions and Composite Coating*, assigned to PPG Industries, Inc.

*Primary Examiner*—W. Robinson H. Clark
*Attorney, Agent, or Firm*—Krisanne Shideler; Kenneth J. Stachel

[57] ABSTRACT

Flexible, aminoplast-curable film-forming compositions and multi-component composite coating compositions comprising at least one pigmented or colored base coat and at least one transparent clear coat are disclosed. A pigmented or colored base coat is first applied to a substrate followed by the application of a clear coat to the base coat. Both the colored base coat and the clear coat are flexible, curable film-forming compositions having an aminoplast crosslinking agent, and the base coat and optionally the clear coat has carbamate functional polymers. The flexible, multi-component composite coating compositions provide improved durability, water spotting resistance, and/or acid etch resistance, making the composite coatings particularly useful for plastic automotive parts.

24 Claims, No Drawings

U.S. PATENT DOCUMENTS

| | | | |
|---|---|---|---|
| 5,445,850 | 8/1995 | Das et al. | 427/407.1 |
| 5,451,656 | 9/1995 | Menovcik et al. | 528/288 |
| 5,474,811 | 12/1995 | Rehfuss et al. | 427/407.1 |
| 5,475,064 | 12/1995 | Menovcik et al. | 525/441 |
| 5,508,379 | 4/1996 | Menovcik et al. | 528/367 |
| 5,512,639 | 4/1996 | Rehfuss et al. | 525/456 |
| 5,532,061 | 7/1996 | Menovcik et al. | 428/423.1 |
| 5,552,497 | 9/1996 | Taylor et al. | 525/456 |
| 5,559,195 | 9/1996 | McGee et al. | 525/383 |
| 5,576,063 | 11/1996 | Briggs et al. | 427/386 |
| 5,593,785 | 1/1997 | Mayo et al. | 428/423.1 |
| 5,605,965 | 2/1997 | Rehfuss et al. | 525/100 |

COLOR-PLUS-CLEAR COMPOSITE COATINGS THAT CONTAIN POLYMERS HAVING CARBAMATE FUNCTIONALITY

CROSS REFERENCE TO RELATED APPLICATIONS

This application is a continuation-in-part of U.S. patent application Ser. No. 08/586,053, filed on Jan. 16, 1996, which is a continuation-in-part of U.S. patent application Ser. No. 08/236,912, filed on Apr. 29, 1994, now abandoned. Reference is made to related U.S. patent application Ser. Nos. 07/968,807, filed Oct. 30, 1992; 08/320,793 filed Oct. 7, 1994; 08/329,915 filed Oct. 27, 1994; 08/345,918 filed Nov. 28, 1994; 08/494,905 filed Jun. 26, 1995 now U.S Pat. No. 5,993,785 and 08/605,420 filed Feb. 22, 1996.

FIELD OF THE INVENTION

The present invention relates to color-plus-clear composite coatings and film-forming or coating compositions containing polymers that have carbamate functionality.

BACKGROUND OF THE INVENTION

Plastic substrates are commonly used in automotive parts and accessories. Organic coating compositions are very often applied to these substrates for decorative and protective purposes. These plastic substrates are made of a variety of flexible thermosetting and thermoplastic materials such as polyethylene and polypropylene, thermoplastic urethane, polycarbonate, thermosetting sheet molding compound, reaction-injection molding compound, acrylonitrile-based materials, nylon, and the like. The coating compositions that are used on these substrates must also be flexible so as to avoid cracking and adhesive failure under normal stresses and torsional forces to which the substrates may be subjected.

Color-plus-clear coating systems involving the application of a colored or pigmented base coat to a substrate followed by the application of a transparent clear coat to the base coat have become very popular as original finishes for automobiles. The color-plus-clear systems have superior gloss and distinctness of image properties.

Acid etch resistance in coatings is becoming an increasingly desirable property, particularly for automotive coatings. Coating systems of the prior art such as the conventional aminoplast-cured systems are not highly effective for providing protection against environmental etching caused by factors such as acid rain.

U.S. Pat. No. 5,356,669 discloses coating compositions containing acrylic polymers with carbamate functionality, and suggests that both base coats and clear coats may contain such polymers. However, such acrylic polymers are not suitable for application over a flexible plastic substrate.

Automotive manufacturers still seek coatings for flexible substrates that provide improved acid etch or water spotting resistance. Such improvements are desired in respect to conventional systems or even in respect to a system comprising a clear coat containing carbamate functional polymers applied over a conventional base coat.

It is desirable to provide novel coating compositions which are suitable for use on flexible automotive substrates and which can be used together as colored base coats and clear coats in a color-plus-clear composite coating system having improved acid etch resistance and/or water spotting resistance properties.

SUMMARY OF THE INVENTION

In accordance with the present invention, flexible, aminoplast-curable film-forming compositions and multi-component composite coating compositions comprising at least one pigmented or colored base coat and at least one clear coat applied on top of the base coat are provided. When a multi-component composite coating composition is used, a pigmented or colored base coat is first applied to a substrate followed by the application of a transparent (i.e., clear) coat to the base coat. In the present invention, the curable colored film-forming composition is flexible and comprises (i) pigment; (ii) a polyester polymer containing a plurality of terminal and/or pendant carbamate groups of the structure:

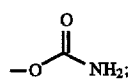

Structure I and (iii) an aminoplast crosslinking agent containing methylol and/or methylol ether groups. The colored film-forming composition may further include one or more polyether polymers containing a plurality of terminal and/or pendant carbamate groups of Structure I and/or hydroxyl groups.

The clear coat is a flexible, curable film-forming composition of: (i) at least two film forming polymers one of which is a polyether along with (ii) at least one aminoplast crosslinking agent containing methylol groups, methylol ether groups, or mixtures thereof. The polyether can be a polymer or part of a polymer that is present in the clear coat composition in amounts of about 3 to about 40 percent by weight based on the total weight of resin solids in the clear coat film-forming composition. Also, the polyether polymer can contain a plurality of terminal and/or pendant carbamate groups of Structure I above.

The second film forming polymer present in the composition can be selected from polymers or oligomers such as polyester polymers, polyurethane polyesters, acrylic polymers, polyurethane polymers or oligomers, polyurethane polyols, or mixtures thereof. Additionally, some or all of these additional film forming polymers can contain a plurality of terminal and/or pendant carbamate groups of Structure I above. Also as in the case of the polyurethane polyol the polymer or oligomer has a plurality of terminal and/or pendant hydroxyl groups.

With the application of the clear coat composition to the base coat composition in a manner that does not interfere with the initial film formation of the base coat, the base coat and clear coat composite coating are cured together.

By "flexible", it is meant that the coating compositions are suitable for application over flexible, usually plastic, substrates such that they will pass standard flexibility testing. For example, in room temperature flex testing where a substrate is coated with the cured coating composition, the coating will pass by having less than 15 uninterrupted line cracks after bending over a mandrel, and this indicates that the coating will exhibit acceptable properties.

DETAILED DESCRIPTION

Unless stated to the contrary herein including the claims hereof molecular weights are number average molecular weights for polymeric materials indicated as "Mn" and obtained by gel permeation chromatography using a polystyrene standard in an art recognized manner. Also as used herein and in the claims, the term "equivalent weight" is a calculated value based on the relative amounts of the various ingredients used in making the specified polymer and is based on the solids of the specified polymer. The relative amounts are those that result in the theoretical weight in grams of the polymer produced from the ingredients and give a theoretical number of the particular functional group that is present in the resulting polymer. The theoretical polymer weight is divided by the theoretical number to give the equivalent weight. For example, carbamate equivalent weight is based on the equivalents of reactive pendant and/or terminal carbamate groups in the carbamate containing polymer. Also, all ranges of amounts of components of the film forming and coating formulations, ratios of amounts, values for Mn, and values for the temperatures of reactions are approximate from about the lower stated value to about the upper stated value unless stated to the contrary. Also, the term "oligomer" refers to lower molecular weight reaction products of the monomer reactants which do not have a substantial number and preferably only a minimal number, if any, repeating units.

In the colored film-forming composition, typically referred to as a base coat, used in the multi-component composite coating composition of the present invention the polyester polymer may be any linear or branched polyesters having the carbamate functionality of Structure I. The polyester may be prepared by the polyesterification of a polycarboxylic acid or anhydride thereof with polyols and/or an epoxide. The polyesters are generally prepared using techniques known to those skilled in the art. Usually, the polycarboxylic acids and polyols are aliphatic or aromatic dibasic acids and diols. Transesterification of polycarboxylic acid esters using conventional techniques is also possible. Optionally, the polyester polymer in the colored filmforming composition may be modified with up to about 0.5 percent by weight, based on the weight of materials used to prepare the polyester, of a diisocyanate. This is done by reacting hydroxyl groups on the polyester with isocyanate groups on the diisocyanate under typical urethane formation conditions. Suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate).

The polyols which are usually employed in making the polyester include alkylene glycols such as ethylene glycol, and other diols such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxyalkylated bisphenols, polyether glycols, for example, poly (oxytetramethylene) glycol and the like. Polyols of higher functionality may also be used. Examples include trimethylolpropane, trimethylolethane, pentaerythritol and the like. Branched polyols such as trimethylolpropane are preferred in the preparation of the polyester.

The acid component of the polyester can be primarily monomeric carboxylic acids or anhydrides thereof having 2 to 18 carbon atoms per molecule. Among the acids which are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are preferred. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred no above, it is understood that anhydrides thereof which exist may be used in place of the acid. Also, lower alkyl esters of diacids such as dimethyl glutarate and dimethyl terephthalate may be used.

Pendant and/or terminal carbamate functional groups may be incorporated into the polyester by reacting isocyanic acid or a low molecular weight alkyl carbamate such as methyl carbamate with a hydroxyl functional polyester. Another method of incorporation is by first forming a hydroxyalkyl carbamate which can be reacted with the polyacids and polyols used in forming the polyester. The hydroxyalkyl carbamate is condensed with acid functionality on the polyester, yielding carbamate functionality. Carbamate functional groups may also be incorporated into the polyester by reacting a hydroxyl functional polyester with a low molecular weight carbamate functional material via a "transcarbamoylation" reaction.

Such a transcarbamoylation reaction may be performed at 130° to 170° C., and at pressures up to ambient pressure. In this reaction, a low molecular weight carbamate functional material derived from an alcohol or glycol ether is reacted with the hydroxyl groups of the polyester polyol, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred. Suitable catalysts include: platinum group metal catalysts; catalyst of carbonyls of cobalt, molybdenum, titanium, rhodium, iron and nickel; bis (salicylaldehyde) ethylenediimine cobalt (II); metal macrocyclic complexes such as those that include metal porphyrins, metal phthalocyanines, and metal complexes derived from Schiff base ligands and the like known to those skilled in the art of carbamate or isocyanate production.

The polyester polymer typically has a Mn of from 500 to 2500, preferably from 800 to 2100, and a calculated carbamate equivalent weight within the range of 200 to 1500, preferably 200 to 500, based on equivalents of reactive pendant and/or terminal carbamate groups. Such a polyester polymer is present in the colored film-forming composition of the present invention in an amount of 25 to 40 percent by weight based on the total weight of resin solids in the colored film-forming composition.

Suitable crosslinking agents present in the colored filmforming composition of the present invention are the amine or amide-aldehyde condensates (aminoplasts) or the polyisocyanate curing agents as are well known in the art. Examples of suitable crosslinking agents are given in U.S. Pat. No. 5,071,904, column 9, line 9 to column 10, line 2. Aminoplast crosslinking agents are preferred. The crosslinking agent is present in the colored coating composition in amounts of 35 percent to 50 percent, preferably 35 to 45 percent, based on the total weight of resin solids in the colored film-forming composition.

The colored coating composition further contains pigments. Color pigments conventionally used in surface coatings include inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

In general, the pigment is incorporated using any grind resin vehicles known to those skilled in the art by any method known in the art into the colored coating composition in amounts of 1 to 80 percent, usually 1 to 30 percent by weight based on the total weight of the colored film-forming composition.

The colored film-forming composition may also include up to 25 percent by weight, based on the total weight of resin solids, of one or more polyether polymers containing a plurality of terminal and/or pendant hydroxyl groups or carbamate groups of the aforedescribed Structure I. The polyether polymers may contain one or both functionalities, or mixtures of polyethers with either or both functionalities may be used. Carbamate functional polyethers are preferred.

Examples of polyether polyols are polyalkylene ether polyols which include those having the following structural formula:

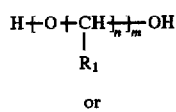  Structure II or

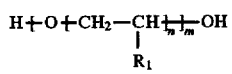  Structure III where the substituent $R_1$ is hydrogen or lower alkyl containing from 1 to 5 carbon atoms including mixed substituents, and n is typically from 2 to 6 and m is from 8 to 100 or higher. Note that the hydroxyl groups as shown in Structures II and III above are terminal to the molecules. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp., West Lafayette, Ind. 47906.

The carbamate functional polyether polymer in the colored film-forming composition of the present invention may be prepared by reacting a polyether polyol with urea under reaction conditions typically employed by those skilled in the art when reacting polyols with urea. Preferably, pendant and/or terminal carbamate functional groups may be incorporated into the polyethers by a transcarbamoylation reaction, which may be performed as described above.

The polyether polymer preferably has a Mn 500 to 5000, more preferably from 1100 to 3200, and an equivalent weight of within the range of about 140 to about 2500, preferably approximately 500, based on equivalents of reactive pendant and/or terminal carbamate groups and based on solids of the polyether polymer. The polyether polymer has on average up to two terminal and/or pendant carbamate groups per molecule. Preferably, the pendant and/or terminal carbamate groups only have the structure depicted in (I) above; i.e., they are not N-substituted (substituted at nitrogen, with organic groups or moieties) but rather have two hydrogen atoms.

If desired, the colored coating composition may contain other optional materials well known in the art of formulated surface coatings. These would include surfactants, flow control agents, thixotropic agents, fillers, catalysts, organic cosolvents, and other customary auxiliaries. These materials can constitute up to about 40 percent by weight of the total weight of the colored film-forming base coat composition.

The colored film-forming compositions of the present invention are preferably used as the pigmented base coat layer in a multi-component composite coating composition such as a "color-plus-clear" coating system, which includes at least one pigmented or colored base coat and at least one clear coat. The base coat film forming composition for the present invention can have one or more suitable solvents such as water and/or one or more organic solvents as is known to those skilled in the art to give the composition an effective solids level for application to substrates as a base coat or color coat of a multicomponent coating system. Nonexclusive examples of some of these organic solvents are indicated in the Examples, infra. Others include water, polar aliphatic solvents, and polar aromatic solvents such as acetates; esters; ketones; and aprotic amides and amines. Suitable solvents include: ethylene glycol butyl ether-acetate, propylene glycol monomethyl ether acetate, m-amyl acetate, methyl ethyl ketone, methyl isobutyl ketone, xylene and blends of aromatic hydrocarbons. For instance, for sprayable compositions, the solvents preferably are suitable to give an effective sprayable solvent borne coating composition with a solids level of 35 to 60 weight percent of the composition. In the coating composition of the present invention, the weight percentages of the various polymeric components discussed above are based on total resin solids of the coating formulation so that with the various polymeric components present in the coating the total weight percentage for resin solids is preferably 100 percent.

The clear film-forming composition for the clear coat or transparent coat used in the multi-component composite coating composition of the present invention is curable and flexible with the polyether component and at least one other curable polymeric film forming material. The polyether may be any of those disclosed above for use in the colored base coat with or without carbamate functionality. Preferred polyethers as polymers include those sold under the names TERATHANE and TERACOL, available from E. I. Du Pont de Nemours and Company, Inc., and POLYMEG, available from Q O Chemicals, Inc., a subsidiary of Great Lakes Chemical Corporation. Nonexclusive examples of useful clear coating compositions utilizing polyether components in polyester-urethane polyol polymers or polyester polyol polymers are those of U.S. Pat. Nos. 4,540,766 and 4,548, 998 in all columns of the patents. Also, a particularly suitable clear coat with polyether polymer is that commercially available from PPG Industries Inc., Pittsburgh, Pa. as UCC1001 including the "C" and "W" variations.

In the preferred embodiment of the invention the clear coat has the polyether polymer with the carbamate functionality of Structure I above and one or more additional curable film forming polymers and/or copolymers of polyester or polyurethane or acrylic polymers, polyurethane polyols, or mixtures thereof with or without urethane oligomers. It is additionally preferred to have one or more of these additional film forming polymers with carbamate functionality like that of Structure I above. Suitable examples of these carbamate-containing polymers include: polyester polymers and oligomers, acrylic polymers, polymeric polyurethane, and oligomeric urethane, both of the latter derived from polyisocyanate, and all of which can contain a plurality of terminal and/or pendant carbamate groups of Structure I above. The polyurethane polyol can have such carbamate functionality or retain its pendant and/or terminal hydroxyl groups.

In the clear film-forming compositions of the present invention, the carbamate functional polyether polymer may be any of those disclosed above for use in the colored base coat including the preferred polyethers. The polyethers may be rendered carbamate functional via a transcarbamoylation reaction or other method as described above. The polyether polymer in the clear film-forming composition has on average up to two terminal or pendant carbamate groups per molecule. Preferably, the pendant and/or terminal carbamate groups only have the structure depicted in (I) above; i.e., they are not N-substituted (substituted at nitrogen, with organic groups or moieties) but rather have two hydrogen atoms.

The carbamate functional polyether polymer is typically present in the clear film-forming composition in amounts of about 5 to about 40, preferably about 10 to about 40 and most preferably 10 to 30 percent by weight based on the total weight of resin solids in the film-forming composition.

The polyester polymer or oligomer that can be present in the clear film-forming composition as an additional polymeric material includes linear or branched polyesters with or without carbamate functionality including any of those disclosed above for use in the colored film-forming composition. Polyesters derived from cycloaliphatic acids and/or anhydrides with pendant and/or terminal carbamate functionality of Structure I are particularly preferred. Though not intending to be bound by any particular theory, it is believed that the use of polyester polymers derived from cycloaliphatic acids and anhydrides improves the durability of the clear film-forming composition.

The polyester polymer typically has a Mn of from 500 to 2500, preferably 800 to 2100, and preferably a calculated carbamate equivalent weight within the range of 200 to 1500, most preferably 200 to 500, based on equivalents of reactive pendant or terminal carbamate groups. The polyester polymer with or without carbamate functional, when present in the clear film-forming composition, is used in amounts up to 60, preferably 20 to 55 percent by weight based on the total weight of resin solids in the clear film-forming composition.

Suitable acrylic polymers for the additional polymer of the clear coat are copolymers of one or more alkyl esters of acrylic acid or methacrylic acid, and, optionally, one or more other polymerizable ethylenically unsaturated monomers. Suitable alkyl esters of acrylic or methacrylic acid include methyl methacrylate, ethyl methacrylate, butyl methacrylate, ethyl acrylate, butyl acrylate, and 2-ethylhexyl acrylate. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. The acrylic polymers may contain hydroxy or hydroxyl functionality which can be incorporated into the acrylic polymer through the use of hydroxy functional monomers such as hydroxyethyl acrylate, hydroxypropyl acrylate, hydroxyethyl methacrylate, and hydroxypropyl methacrylate which may be copolymerized with the other acrylic monomers.

The acrylic polymer may be prepared by solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art.

Carbamate functional groups may be incorporated into the acrylic polymer by copolymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate with methacrylic anhydride. Other carbamate functional vinyl monomers are, for instance, the reaction product of a hydroxyalkyl (meth) acrylate such as hydroxyethyl methacrylate, a diisocyanate such as isophorone diisocyanate, and a carbamate functional alcohol such as hydroxypropyl carbamate. Monomers such as reaction products of hydroxyethyl methacrylate and a diisocyanate are disclosed in U.S. Pat. No. 5,098,947 at columns 3–8. Still, other carbamate functional vinyl monomers may be used, such as the reaction product of isocyanic acid (HNCO) with a hydroxyl functional acrylic or methacrylic monomer such as hydroxyethyl acrylate and those described in U.S. Pat. No. 3,479,328 at columns 1–7. Carbamate groups can also be incorporated into the acrylic polymer by reacting a hydroxyl functional acrylic polymer with a low molecular weight carbamate functional material via a transcarbamoylation process similar to the one described above in connection with the incorporation of carbamate groups into the polyethers.

The acrylic polymer typically has a Mn of from 900 to 13,000, preferably from 1000 to 5000, and preferably a calculated carbamate equivalent weight less than 5000, most preferably within the range of 140 to 2500, based on equivalents of reactive carbamate groups. Such carbamate functional acrylic polymers, when present in the film-forming composition, are used in amounts up to 50 and preferably up to 20, and most preferably about 10 to about 20 percent by weight based on the total weight of resin solids in the film-forming composition.

Also, polyurethanes can be used as the additional film forming polymer in the clear coat coating composition. Suitable polyurethane polymers are those with pendant and/or terminal carbamate functionality or groups. Among the polyurethanes which can be used are polymeric reaction products of polyols, which are prepared by reacting the polyester polyols or acrylic polyols such as those mentioned above, with a polyisocyanate such that the OH/NCO equivalent ratio is greater than 1:1 so that free hydroxyl groups are present in the product. Such reactions employ typical conditions for urethane formation, for example, temperatures of about 60° to about 90° C. and up to ambient pressure, as known to those skilled in the art.

The organic polyisocyanate which is used to prepare the polyurethane polymer can be an aliphatic or an aromatic polyisocyanate or a mixture of the two. Diisocyanates are preferred, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Pendant carbamate functional groups may be incorporated into the polyurethane by reacting a polyisocyanate with a polyester polyol containing the pendant carbamate groups. Alternatively, the pendant carbamate functional groups may be incorporated into the polyurethane by reacting a polyisocyanate with a polyester polyol and a hydroxyalkyl carbamate or isocyanic acid as separate reactants. Pendant carbamate functional groups may also be incorporated into the polyurethane by reacting a hydroxyl functional polyurethane with a low molecular weight carbamate functional material via a transcarbamoylation process similar to the one described above in connection with the incorporation of carbamate groups into the polyethers.

The polyurethanes typically have a Mn of from about 300 to 3100, preferably from about 300 to 2500, and a carbamate equivalent weight within the range of 140 to 2600, based on equivalents of reactive pendant or terminal carbamate groups. The polyurethane polymer, when present in the film-forming composition, is used in amounts up to 55, preferably up to 20 percent by weight based on weight of resin solids in the film-forming composition.

In addition to or as a substitute for the other additional polymeric components, a polyurethane polyol with a plurality of pendant and/or terminal hydroxyl functionality can be employed in the coating formulation. Polyurethane polyols can be prepared by reacting polyol with polyisocyanate as described above and used as is without the addition of carbamate functionality. The organic polyisocyanate reacted with polyols to form the polyurethane polyol can be the same ones as those described above for the polyurethane polymer. As for the polyol reactants, these can include those described above in the preparation of the polyester. The polyurethane polyol generally can have a hydroxyl equivalent weight within the range of 250 to 500, based on equivalents of reactive hydroxyl groups.

A particularly preferred polyurethane polyol is the reaction product of butyl ethyl propane diol and the isocyanurate of hexamethylene diisocyanate, available as SETALUX EPC/90/2/48 from Industrial Colors and Chemicals Limited, manufactured by AKZO Nobel Resins. This type of hydroxyl functional polyurethane is also described in U.S. Pat. No. 5,130,405.

Another polymeric component useful in the film-forming composition as a clear coat for the present invention may be at least one urethane oligomer with pendant and/or terminal carbamate groups of the Structure I and/or an amide functional acrylic polymeric material. Both of these polymeric components are preferably used with at least one of the aforedescribed type additional polymeric components, and the carbamate containing polyether.

The urethane oligomer containing a plurality of such carbamate groups can be prepared in a manner similar to the polyurethane polymer with similar reactants but without achieving a high degree of polymerization. For instance, the organic polyisocyanate which is used can be an aliphatic or an aromatic polyisocyanate or a mixture of the two like those described above and diisocyanates or a combination of diisocyanates are suitable. Some higher polyisocyanates also can be utilized. Carbamate functionality also can be provided to the oligomer in a manner similar to that for the polyurethane. Particularly suitable carbamate functional urethane oligomers may be prepared by reacting a hydroxyalkyl carbamate, such as the reaction product of ammonia and ethylene carbonate or propylene carbonate, with a polyisocyanate. Among the urethane oligomer adducts are the reaction products of diisocyanate and hydroxyalkyl carbamates, wherein the alkyl group generally can have from 2 to 10 carbons. An example is the reaction product of isophorone diisocyanate and hydroxypropyl carbamate and/or hydroxyethylcarbamate. A suitable carbamate functional urethane oligomer is the reaction product of hydroxypropyl carbamate and isophorone diisocyanate as known to those skilled in the art as shown in U.S. Pat. No. 5,512,639. Such reactions employ typical conditions for urethane formation, as known to those skilled in the art.

Generally, the urethane oligomer can have a Mn like the polyurethane of from 300 to 3100, preferably from 300 to 2500, but the oligomer typically has a molecular weight in the lower to middle portion of the range. An exception is when higher molecular weight monomers are used as reactants in which case the molecular weight can be higher. Also, the calculated carbamate equivalent weight of the urethane oligomer and the amount of the urethane oligomer in the coating composition is similar to that for the aforedescribed polyurethanes.

The urethane oligomer can be used in amounts preferably of 10 to 40 percent by weight based on the total weight of resin solids in the film-forming composition. Though not intending to be bound by any particular theory, it is believed that the use of polyurethanes and/or urethane oligomer improves the water spotting resistance of the film-forming composition.

The acrylic polymer containing a plurality of amide groups as a polymeric component of the film-forming composition, optionally, may have a plurality of terminal and/or pendant carbamate groups of Structure I. In other words the acrylic polymer may contain amide functionality alone or both amide and carbamate functionality on the same molecules. Suitable acrylic polymers are copolymers of one or more alkyl esters of acrylic acid or methacrylic acid and, optionally, one or more other polymerizable ethylenically unsaturated monomers, such as those described above.

Amide functionality may be introduced into the polymer by reacting ethylenically unsaturated amide functional monomers with the other acrylic monomers. Suitable amide functional monomers include, inter alia, acrylamide, methacrylamide, N-isopropylacrylamide, and N-tert-butylacrylamide. Methacrylamide is preferred. The copolymers can be formed as random or graft copolymers where the latter is formed by polymerizing a second monomer in the presence of an acrylamide homopolymer or a dispersion of the homopolymer. The polymerization reactions can be free-radical reactions with free radical catalysts as described above for acrylic polymerization or by other methods known to those skilled in the art.

Carbamate functionality may be introduced into the polymer as described above in carbamylation of acrylic polymers. For instance, the copolymer of the acrylamide or methacrylamide is made with hydroxy functional acrylate like hydroxyethylmethacrylate, hydroxypropylmethacrylate and the like and transcarbamylation is conducted to give the copolymer carbamate functionality.

The amide functional acrylic polymer typically has a Mn of from 900 to 13,000, preferably from 1000 to 5000, and has an amide equivalent weight within the range of 170 to 1700, based on equivalents of reactive amide groups.

The amide functional acrylic polymer can be used in amounts of up to about 30, preferably about 10 to about 15 percent by weight based on the total weight of resin solids in the film-forming composition. Not intending to be bound by any particular theory, it is believed that the amide functional acrylic polymer serves to control the rheology of the film-forming composition during application to a substrate.

In addition, the film-forming composition of the present invention further can have (particularly in combination with the amide functional acrylic polymer) up to about 3 percent by weight, preferably about 1 to about 2 percent by weight of an amorphous hydrophilically modified silica. The percentages by weight are based upon total resin solids in the coating composition. Suitable modified silicas are colloidal silica including fumed silicas which have been partially or totally modified on their surfaces through the silanization of hydroxyl groups on the silica particle. Examples of suitable silicas include AEROSIL R972, AEROSIL R812 and AEROSIL R805, all commercially available from Degussa Corporation. A particularly preferred silica is a hydrophilic fumed silica, available from Degussa Corporation as AEROSIL 300 silica.

The silica may be added to the film-forming composition neat or may be dispersed in one of the component polymers by a grinding process. This latter approach is that which is known to those skilled in the art of incorporating pigments into coating formulations using conventional equipment such as high-speed blade mixers, ball mills or sand mills. If the silica is dispersed in a polymer such as the amide functional acrylic copolymer above, the dispersion may be added to the coating composition at any time during formulation as a rheology control additive mixture.

The clear film-forming composition also includes an aminoplast crosslinking agent containing methylol groups, methylol ether groups, or mixtures thereof. Aminoplasts are obtained from the reaction of formaldehyde with an amine or amide or carbamate. The latter as described in U.S. Pat. No. 3,479,328 (Nordstrom). The most common amines or amides are melamine, urea, or benzoguanamine, and are preferred. However, aminoplast condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose such as those containing 1 to 6 carbon atoms including methanol, ethanol, butanol, isobutanol, cyclohexanol and hexanol and blends thereof. Also, fully alkylated aminoplast crosslinking agents can be used which refer to those where the alkylol groups associated with the reaction product of an aldehyde with an amine and/or an amide have been etherified to an extent that the alkoxy groups constitute at least eighty (80) percent by weight of the functional groups of the aminoplast. One example of a blend that can be used includes methanol and n-butanol which results in a melamine-formaldehyde condensate that is, on average, 75 percent methylated and 25 percent butylated. The type of aminoplast employed in the clear coat film forming composition can also be the type of aminoplast used as the crosslinking agent in the base coat film forming polymer.

Preferably, the aminoplasts which are used are melamine-, urea-, or benzoguanamine-formaldehyde condensates etherified with an alcohol containing from one to four carbon atoms. The aminoplast is present in amounts of about 15 to about 50, preferably about 20 to about 35 percent by weight based on the total weight of resin solids in the clear film-forming composition. Generally, these types of aminoplasts used in the clear coat composition can be the same types of aminoplasts used for the base coat compositions.

Usually, the clear film-forming composition will also preferably contain catalysts to accelerate the cure of the aminoplast and carbamate and/or hydroxyl groups that are present. Examples of suitable catalysts are acidic materials and include acid phosphates and sulfonic acid or a substituted sulfonic acid such as dodecylbenzene sulfonic acid or paratoluene sulfonic acid. The catalyst is usually present in an amount of 0.5 to 5.0 percent by weight, preferably 1 to 2 percent by weight, based on the total weight of resin solids. Optional ingredients such as, for example, plasticizers, flow controllers, anti-oxidants, UV light absorbers and similar additives conventional in the art may be included in the composition. These ingredients are typically present at up to 25% by weight based on the total weight of resin solids in the clear film-forming composition.

Preferably for the coating composition, the equivalent ratio of the pendant and/or terminal carbamate groups in the polymers to methylol or methylol ether groups in the aminoplast is preferably from about 0.5 to about 2:1 and is sufficient to form a crosslinked film. The resultant crosslinked coating contains a substantial number of urethane crosslinks which arise from reaction of the terminal or pendant carbamate groups with the aminoplast, thereby providing a high level of acid etch resistance. By "high level", it is meant that the resistance of the coating composition to etching by acid rain is significantly improved compared to conventional hydroxyl-aminoplast cured coating compositions.

As with the base coat composition, in the clear coating compositions of the present invention, one or more solvents such as water and/or one or more organic solvents can be used as carriers. Preferably, the clear coat is solvent borne with organic solvents like those used in the examples, infra, or other similar solvents known to those skilled in the art and described above. For the solvent borne coatings, the total solids content or the total resin solids can be in the range of 35 to 60 preferably towards the middle to upper region of the range to make a higher solids coating composition. In any event the solvents used and the total resin solids are used in amounts for effective application of the clear coat composition to the substrate, which preferably has the base coat.

Coating compositions of the present invention can be applied to various substrates to which they adhere, including wood, metals, glass, cloth plastic, foam, including elastomeric substrates and the like. They are particularly effective in applications over plastic substrates that are found on motor vehicles. By "plastic", it is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon and the like.

The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the coating composition to the substrate, ambient relative humidity may range from about 30 to about 80 percent, preferably about 50 percent to about 70 percent.

A film of the coating is formed on the substrate during application of the coating composition to the substrate. Typically, the coating thickness will be about 0.1 to 5 mils (2.54 to 127 microns), preferably 0.4 to about 1.5 mils (10.16 to 38.1 microns) in thickness.

After application of the colored base coat to the substrate, a film is formed on the surface of the substrate by driving solvents out of the film by heating or by an air drying period. The heating will preferably be only for a short period of time and will be sufficient to ensure that a topcoat such as a clear coat can be applied to the coating if desired without the former dissolving the base coat composition. Suitable drying conditions will depend on the particular base coat composition and on the ambient humidity, but in general a drying time of from about 1 to about 5 minutes at a temperature of about 80°–250° F. (20°–121° C.) will be adequate to ensure that mixing of the two coats is minimized. At the same time, the base coat film is adequately wetted by the topcoat composition so that satisfactory intercoat adhesion is obtained. The meaning of the term "topcoat" as used herein only indicates that the clear coat is over top of the base coat and not necessarily, although it preferably is, the uppermost or outermost coating of the multi-component coating system. Also, more than one base coat and multiple top coats may be applied to develop the optimum appearance. Usually between coats, the previously applied coat is flashed; that is, exposed to ambient conditions for about 1 to about 20 minutes.

After application of the coating composition(s), the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.) but if needed, lower or higher temperatures may be used as necessary to activate crosslinking mechanisms. The thickness of the clear coat is usually from about 0.5 to about 5 mils (12.7 to 127 microns), preferably about 1.2 to about 3 mils (30.48 to 76.2 microns).

The invention will be further described by reference to the following examples. Unless otherwise indicated, all parts are by weight. Examples A through E illustrate the preparation of various carbamate functional polymers and oligomers.

EXAMPLE A

An acrylic polyol was prepared from the following ingredients:

| Ingredients | Weight in grams |
| --- | --- |
| Charge 1 | |
| butyl acetate | 580 2 |
| xylene | 627.2 |
| Charge 2 | |
| styrene | 342.7 |
| hydroxyethyl methacrylate | 567.9 |
| ethylhexyl acrylate | 339.5 |
| ethylhexyl methacrylate | 381.9 |
| Charge 3 | |
| xylene | 39.2 |
| butyl acetate | 31.4 |
| LUPERSOL PMS[1] | 179.5 |
| Charge 4 | |
| xylene | 15.7 |
| butyl acetate | 15.7 |
| Charge 5 | |
| butyl acetate | 62.7 |
| LUPERSOL PMS | 32.6 |
| Charge 6 | |
| butyl acetate | 15.7 |
| xylene | 31.4 |
| Charge 7 | |
| xylene | 31.4 |
| butyl acetate | 15.7 |

[1]t-butyl peroctoate, 50% in odorless mineral spirits, available from Atochem North America, Inc., Philadelphia, Pennsylvania.

Charge 1 was added to a reactor equipped with a reflux condenser and heated to reflux under a nitrogen blanket. Charges 2 and 3 were begun at the same time and added to the reactor over a period of three hours. Upon completion of Charge 3, Charge 4 was added to the reactor as a rinse for Charges 2 and 3. Charge 5 was then added to the reactor over a period of 1 hour. Upon completion of Charge 5, Charge 6 was added as a rinse for Charge 5 and the reaction held at constant temperature for 1.5 hours. Charge 7 was then added to the reactor as a final thinning solvent. The resulting resin had a measured solids of 50.5%, a viscosity of 1.7 stokes, a number average molecular weight of 1231 and a weight average molecular weight of 7124 as determined by gel permeation chromatography versus a polystyrene standard.

EXAMPLE B

A carbamate functional acrylic was prepared from the following ingredients:

| Ingredients | Weight in grams |
| --- | --- |
| acrylic polyol resin of Example A | 2869.6 |
| triphenyl phosphite | 2.87 |
| triphenyl phosphite | 2.87 |
| butyl stannoic acid | 2.87 |
| DOWANOL PM carbamate solution[1] | 852.3 |
| DOWANOL PM[2] | 693.6 |

[1]Reaction product of DOWANOL PM and urea, 59.3% solids in DOWANOL PM.
[2]Propylene glycol methyl ether, available from Dow Chemical Co.

The acrylic polyol and triphenyl phosphite were charged to a suitable reactor equipped for vacuum distillation and heated to 140° C. under an nitrogen blanket. At this temperature, solvent was stripped from the resin under reduced pressure. At the completion of the solvent strip, the vacuum was broken with nitrogen and the temperature of the resin was reduced to 70° C. Additional triphenyl phosphite was added to the reactor and the reaction held at 70° C. for 15 minutes. Butyl stannoic acid and DOWANOL PM carbamate solution were then added to the reactor and the reaction was degassed three times (vacuum 5 minutes followed by backfilling with nitrogen). A small amount of DOWANOL PM from the DOWANOL PM carbamate solution distilled over during the degassing process. The reaction mixture was then heated to 140° C. and DOWANOL PM (as solvent and reaction by-product) removed under reduced pressure. The reaction was continued until a reactor pressure of 1 mm Hg was attained and distillation of DOWANOL PM ceased. The resin was cooled and reduced with DOWANOL PM. The final resin had a measured solids of 71.6%, a viscosity of z6 on the Gardner-Holt viscosity scale, and a number average molecular weight of 3423 and a weight average molecular weight of 15037 as measured by gel permeation chromatography versus a polystyrene standard.

EXAMPLE C

A carbamate terminal polyurethane polymer was prepared from the following ingredients:

| Ingredients | Weight in grams |
| --- | --- |
| isophorone diisocyanate | 166.5 |
| methyl isobutyl ketone | 79.7 |
| dibutyltin dilaurate | 0.1 |
| 1,6-hexanediol | 29.5 |
| hydroxypropyl carbamate | 122.6 |
| DOWANOL PM[1] | 132.7 |

[1]Propylene glycol methyl ether, available from Dow Chemical Co., Midland, Michigan.

The first four ingredients were charged to a suitable reactor and the reaction heated to 80° C. The reaction was held at this temperature until an NCO equivalent weight of 278 was reached. Hydroxypropyl carbamate was added to the reaction and the reaction held at temperature. An additional 20 g (in two 10 g charges) was added to the reactor to react off remaining isocyanate groups. The reaction was held at temperature until no NCO functional groups were apparent by IR spectroscopy. The resulting reaction product was then thinned with DOWANOL PM. The thinned resin had a measured solids (110° C./1 hr) of 63.1%, a viscosity of Z2- on the Gardner-Holt scale, a number average molecular weight of 1427, and a weight average molecular weight of 2345 as determined by gel permeation chromatography versus a polystyrene standard.

EXAMPLE D

A carbamate functional linear polyester urethane was prepared from the following ingredients:

| Ingredient | Weight in grams |
| --- | --- |
| polyester urethane polyol[1] | 2348.4 |
| triphenylphosphite | 2.35 |
| DOWANOL PM carbamate | 744.66 |
| butyl stannoic acid | 3.10 |
| triphenylphosphite | 3.10 |

[1]Reaction product of neopentyl glycol, hexahydrophthalic anhydride, adipic acid, and 4,4'-methylenebis(cyclohexyl isocyanate) (available as DESMO- DUR W from BAYER USA, Pittsburgh, Pennsylvania) in a 1.00:0.50:0.22:0.002 mole ratio, having a hydroxyl value of 159.3 based on weight of resin solids, 90.0% in DOWANOL PM acetate.

The first two ingredients were charged to a suitable reactor equipped for vacuum distillation and heated to 140° C. under a $N_2$ blanket. Vacuum was applied to the system and DOWANOL PM acetate solvent was removed from the pot under reduced pressure. The reaction was cooled to 80° C. and the remaining ingredients were added to the reactor. The reaction mixture was heated to 100° C. and sparged with nitrogen for 20 minutes at this temperature. Upon completion of sparging, the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm Hg to maintain a steady distillation of DOWANOL PM. After the reaction was complete, the reaction product was thinned with 661 g DOWANOL PM acetate to a measured solids of 84.0% and a viscosity of Z5 on the Gardner-Holt scale. The thinned reaction product had a OH value of 18.5 based on resin solids, a number average molecular weight of 873, and a weight average molecular weight of 1292. The calculated carbamate equivalent weight was 479.

EXAMPLE E

A carbamate functional polyether was prepared from the following ingredients:

| Ingredient | Weight in grams |
| --- | --- |
| POLYMEG 1000[1] | 2000.00 |
| DOWANOL PM carbamate[2] | 524.4 |
| butyl stannoic acid | 2.51 |
| triphenylphosphite | 2.51 |

[1]Polytetramethylene glycol, having a number average molecular weight of about 1000, available from Q O Chemicals, Inc., a subsidiary of Great Lakes Chemical Corp.
[2]Reaction product of Propylene glycol methyl ether (available from Dow Chemical Co. as DOWANOL PM) and urea, 96.0% in DOWANOL PM.

A suitable reactor equipped for vacuum distillation was charged with the above ingredients and heated to 100° C. The reaction mixture was sparged with $N_2$ for 20 minutes at this temperature. Upon completion of sparging, the temperature of the reaction mixture was raised to 140° C. Vacuum was applied to the system until DOWANOL PM began to distill from the reaction mixture. The vacuum on the system was gradually increased as the reaction progressed to a maximum vacuum of 1 mm Hg in order to maintain a steady distillation of DOWANOL PM. The resultant reaction mixture was a soft, white, waxy opaque material with a OH value of 15.4, a total Nitrogen (N) content of 3.67%, and a number average molecular weight of 1748 as determined by gel permeation chromatography using a polystyrene standard. The calculated carbamate equivalent weight was 571.

Examples 1 to 4 illustrate the preparation of various pigmented film-forming compositions useful as base coats in composite coating compositions. Example 1 is a control, illustrating the preparation of a hydroxyl functional base coat composition. Examples 2 and 3 illustrate the preparation of a pigmented film-forming composition according to the present invention containing a carbamate functional polyester urethane. Example 4 illustrates the preparation of a pigmented film-forming composition according to the present invention, containing an optional carbamate functional polyether. Examples 5 and 6 illustrate the preparation of clear film-forming compositions according to the present invention. Example 5 is a clear coat composition containing a hydroxyl functional polyurethane oligomer and Example 6 is a clear coat composition containing a carbamate functional polyurethane polymer and a carbamate functional acrylic polymer. For each of the Examples, the ingredients were mixed together essentially in the order listed under agitation in a suitable container.

| | EXAMPLE | | | |
| --- | --- | --- | --- | --- |
| | 1 (Control) | 2 | 3 | 4 |
| Ingredient | Solution weight in grams | Solution weight in grams | Solution weight in grams | Solution weight in grams |
| methyl isobutyl ketone | 4 | 4 | 4 | 4 |
| toluene | 11 | 11 | 11 | 11 |
| xylene | 3 | 3 | 3 | 3 |

-continued

| Ingredient | EXAMPLE | | | |
|---|---|---|---|---|
| | 1 (Control) Solution weight in grams | 2 Solution weight in grams | 3 Solution weight in grams | 4 Solution weight in grams |
| TINUVIN 328[1] | 1 | 1 | 1 | 1 |
| CYMEL 1130[2] | 41 | 41 | 41 | 41 |
| Microgel[3] | 18.2 | 18.2 | 18.2 | 18.2 |
| Polyester polyol[4] | 9.3 | 9.3 | — | — |
| Acrylic grind resin[5] | 13 | 13 | 13 | 13 |
| n-butyl acetate | 14 | 14 | 14 | 14 |
| MONARCH 1300[6] | 3 | 3 | 3 | 3 |
| CYMEL 1130 | 6.7 | 6.7 | 6.7 | 6.7 |
| Carbamate functional polyester urethane of Example D | — | 45.3 | 58 | 42.4 |
| Carbamate functional polyether of Example E | — | — | — | 10 |
| Dinonylnaphthalene disulfonic acid | — | — | 2.7 | 2.7 |
| dodecylbenzene sulfonic acid | 1.4 | 1.4 | — | — |
| n-propanol | 12 | 12 | 12 | 12 |
| Polyester polyol[7] | 32.2 | — | — | — |

[1]2-(2'-Hydroxy-3',5'-ditert-amylphenyl) benzotriazole UV light stabilizer available from Ciba-Geigy Corp.
[2]Methylated, butylated melamine formaldehyde resin available from CYTEC Industries, Inc.
[3]A polymeric microparticle prepared in accordance with U.S. Pat. No. 4,147,688, Example II.
[4]Reaction product of 42.5 pbw neopentyl glycol and 57.5 pbw hexahydrophthalic anhydride, having a hydroxyl value of 301 based on the total weight of resin solids.
[5]Reaction product of styrene, 2-ethylhexyl acrylate, butyl methacrylate, methyl methacrylate, hydroxyethyl acrylate, methacrylic acid, and acrylic acid.
[6]Black pigment available from Cabot Corp.
[7]Reaction product of 50 pbw 1,6-hexanediol, 30.5 pbw hexahydrophthalic anhydride, and 19.5 pbw adipic acid, having a hydroxyl value of 128 based on the total weight of resin solids.

| Ingredient | EXAMPLE | |
|---|---|---|
| | 5 Solution weight in grams | 6 Solution weight in grams |
| n-butanol | 15 | 15 |
| 2-butoxyethyl acetate | 5 | 5 |
| xylene | 15 | 15 |
| Propylene glycol methyl ether | 10 | 10 |
| n-propanol | 5 | 5 |
| TINUVIN 328[1] | 3.0 | 3.0 |
| xylene | 9.0 | 9.0 |
| AEROSIL R812 dispersion[2] | 12.5 | 12.5 |
| RESIMENE 741[3] | 28.4 | 28.4 |
| Carbamate functional polyether of Example E | 20.0 | 20.0 |
| Carbamate functional polyurethane polymer of Example C | — | 56.1 |
| Carbamate functional acrylic polymer of Example B | — | 21.0 |
| Dow Corning 200[4] | 0.74 | 0.74 |
| BAYSILONE OL 17[5] | — | 0.25 |
| BYK 325[6] | 0.13 | — |
| Polybutylacrylate[7] | 0.42 | 0.42 |
| Dodecylbenzene sulfonic acid | 1.1 | 1.1 |
| SETALUX EPC/90/2/48[8] | 88 | — |

[1]Substituted benzotriazole UV light absorber available from Ciba Geigy Corporation.
[2]Eight (8) parts by weight (pbw) of a highly dispersed hydrophobic amorphous silicon dioxide available from Degussa Corporation; 50 pbw of a solution of hydroxyl functional acrylic polymer having a peak molecular weight of 8000, Mw of 9000, Mn of 3500 (determined by gel permeation chromatography using a polystyrene standard) made from 40% hydroxypropyl acrylate, 20% styrene, 19% butyl acrylate, 18.5% butyl methacrylate, 0.5% methyl methacrylate, 2% acrylic acid at 70% solids in isobutanol, xylene, and SOLVESSO 100; 48.75 pbw xylene; 1.5 pbw isobutanol; 6.75 pbw SOLVESSO 100.
[3]Partially methylated aminoplast resin available from Monsanto Chemical Company, St. Louis, Missouri.
[4]Polymethylsiloxane solution, available from Dow Corning Corporation.
[5]Polyether polysiloxane, available from Bayer USA
[6]Solution of polyoxyalkylene-methylalkyl-polysiloxane copolymer available from Byk-Chemie USA related to Byk-Chemie, Germany, a subsidiary of Altana Group.
[7]Flow control agent having a Mw of about 6700 and a Mn of about 2600, made in xylene at 60% solids.
[8]Oligomeric polyurethane polyol available from Industrial Colors and Chemicals Limited, manufactured by AKZO NOBEL Resins, East Saint Louis, Illinois. It is the reaction product of DESMODUR N3390 (Polyisocyanate based on hexamethylene diisocyanate, available from BAYER USA) and butyl ethyl propane diol in a solution of n-butyl acetate and AROMATIC 100 (acetate ester available from Exxon Chemicals America, Houston, Texas).

Thermoplastic polyolefin test substrates available from Himont Advanced Materials, Frankfurt, Germany, as ETA-3183 were prepared for coating and acid etch testing by first spray applying a solventborne adhesion promoter available from PPG Industries, Inc., Pittsburgh, Pa. as MPP4110 to the substrate at a thickness of 0.25 mils (6.35 microns) at ambient atmospheric conditions. The resulting film was dried at ambient atmospheric conditions for two minutes. The promoter was then immediately coated with 1.0 mils (25.4 microns) of one of the pigmented base coat compositions of Examples 1 to 4. One clear coat selected from the clear film-forming compositions of Examples 5 and 6 and a polyether-containing and hydroxyl-aminoplast containing clear coat available from PPG Industries, Inc., as UCC1001, was then applied separately wet-on-wet at a thickness of 1.6 mils (40.64 microns) to base coated substrates, so that various base coat/clear coat combinations were obtained. In addition, thermoplastic urethane panels (available from B.F. Goodrich Company as ESTANE 58130 TPU) were each coated with the same base coats as used above, and then separately coated with one of the clear coat compositions of Examples 5 and 6 and the same polyether and hydroxyl-aminoplast UCC1001 clear coat as used above.

The resultant composite coatings were cured at 250° F. (121.1° C.) for 30 minutes to cure both the base coat and clear coat. The panels were baked in a horizontal position. The properties of the composite coatings are reported in Table I below.

TABLE I

| Base Coat Example | Clear Coat Example | Room Temperature Flex[1] | Cold Flex[2] | Fort Lauderdale Spot[3] | Lab Acid Etch[4] |
|---|---|---|---|---|---|
| 1 (Control) | UCC1001C | 10 | 10 | 12 | 3 |
| 1 (Control) | 5 | 10 | 10 | 8 | 2 |
| 1 (Control) | 6 | 8 | 6 | 10 | 2 |

TABLE I-continued

| Base Coat Example | Clear Coat Example | Room Temperature Flex[1] | Cold Flex[2] | Fort Lauderdale Spot[3] | Lab Acid Etch[4] |
|---|---|---|---|---|---|
| 2 | UCC1001 | 10 | 9 | 10 | 3 |
| 2 | 5 | 9+ | 8 | 4 | 1 |
| 2 | 6 | 8 | 6 | 2 | 1 |
| 3 | UCC1001 | 10 | 6 | 2 | 3 |
| 4 | UCC1001 | 10 | 8 | 6 | 3 |

[1]Flexibility of the color-plus-clear composite coating was measured at room temperature over ESTANE 58130 TPU (available from B. F. Goodrich Company) by bending it over a half-inch (1.27 cm) diameter mandrel (see U.S. Pat. No. 4,540,766 column 2, lines 36–57). A value below 8 on a scale of 1 to 10 is considered borderline for flexibility. A value below 6 indicates more than 15 uninterrupted line cracks and is considered unacceptable. A value of 10 means that there is no cracking of the composite coating.
[2]Brittleness of the color-plus-clear composite coating over ESTANE 58130 TPU was tested by cooling the coated plastic substrate to 0° F. (−17° C.) for 24 hours and bending it over a 1 inch (2.54 cm) mandrel. The same rating scale applies as in room temperature flex testing.
[3]Data were collected at the Fort Lauderdale, Florida PPG atmospheric test site. 4 × 6 inch (10.16 × 15.24 cm) test specimens are mounted on 4 × 12 inch (10.16 × 30.48 cm) aluminum panels and exposed facing south at an angle of 5° with no insulation. The above data were collected after two years exposure from June 6, 1994 to July 24, 1996. Topcoat damage at this site is recorded as "spotting" and is caused by solid particle deposits on the surface (1 = no observable damage, 12 = severe spotting with hard ion deposit and etching.)
[4]Test panels were spotted with two superimposed drops of 0.6 N sulfuric acid and placed in an electric oven at 120 F. for 30 minutes. The panels were removed from the ovens, rinsed, and evaluated on a 0–3 scale (0 = no observable etching, 3 = severe etching).

The data in Table I illustrate that when a base coat containing carbamate functional materials and a clear coat containing carbamate functional materials are applied as a color-plus clear composite coating as in the present invention, spotting and more particularly, etching are greatly improved. Also, when a base coat containing carbamate functional materials are applied as a color plus clear composite coating with a commercially available polyether-containing and hydroxyl-aminoplast-containing clear coat the water spot resistance can be improved although etch is not improved. This is in comparison to when the same clear coats are used over a conventional hydroxyl-aminoplast base coat. Note that the clear coat of Example 6 appears to have contributed to a loss of flexibility, but this can be improved by decreasing the amount of polyurethane present to within the preferred range.

We claim:

1. A multi-component composite coating composition, comprising: (I) a pigmented film-forming composition as a base coat, and (II) a clear film-forming composition as a transparent coat over the base coat wherein the base coat has: (Ia) pigment; (Ib) a resinous binder selected from the group consisting of acrylic polymers, polyesters including alkyds, and polyurethanes; and (Ic) an aminoplast crosslinking agent containing methylol and/or methylol ether groups; and wherein the transparent coat is a flexible, curable film-forming composition comprising (IIa) a polyether polymer containing a plurality of carbamate groups of the structure:

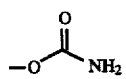

Structure I selected from terminal and pendant and mixtures of these groups present in the film-forming composition in amounts of about 5 to about 40 percent by weight based on the total weight of resin solids in the film-forming composition;

(IIb) a polymer selected from the group consisting of a polyester polymer, a polyurethane polymer, an acrylic polymer, and mixtures thereof wherein each polymer contains a plurality of carbamate groups of the Structure I, and (IIc) an aminoplast crosslinking agent containing methylol groups, methylol ether groups, or mixtures thereof.

2. The multi-component composite coating composition of claim 1 wherein the (Ib) resinous binder is a polyester polymer containing a plurality of carbamate groups of Structure I selected from pendant and terminal groups and mixtures thereof:

and wherein the pigmented film-forming composition (I) has up to about 25 percent by weight, based on the total weight of resin solids in the pigmented film-forming composition, of one or more polyether polymers containing a plurality of functional groups that are terminal, pendant, or mixtures thereof selected from the groups consisting of hydroxyl, and carbamate groups of Structure I.

3. The multi-component composite coating composition of claim 2 wherein the (Ib) polyester polymer with carbamate groups is derived from cycloaliphatic acid or anhydride.

4. A multi-component composite coating composition comprising: (I) a pigmented film-forming composition as a base coat, and (II) a clear film-forming composition as a transparent coat over the base coat, wherein the base coat is a flexible, curable film-forming composition comprising: (Ia) pigment; (Ib) a polyester polymer containing a plurality of carbamate groups of the structure:

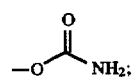

Structure I selected from the group consisting of terminal groups, pendant groups and mixtures thereof, (Ic) an aminoplast crosslinking agent containing methylol and/or methylol ether groups; and (Id) up to about 25 percent by weight, based on the total weight of resin solids in the pigmented film-forming composition, of one or more polyether polymers containing a plurality of functional groups selected from the group consisting of hydroxyl and carbamate groups of Structure I that are selected from the group consisting of terminal, pendant and mixtures thereof; and wherein the transparent coat is a flexible, curable film-forming composition selected from the group consisting of:

(IIA)(i) at least two film forming polymers where (a) one is a polymeric material with a polyether component, and (b) a second is selected from polyester polymers or oligomers, polyurethane polyesters, acrylic polymers, polyurethane polymers and oligomers, and mixtures thereof; and (ii) an aminoplast crosslinking agent containing methylol groups, methylol ether groups, or mixtures thereof; and (IIB)(i) at least two film forming polymers where:
(a) is a polyether polymer containing a plurality of carbamate groups of the Structure I selected from the group consisting of terminal groups, pendant groups, and a mixture thereof, and
(b) at least one polymer or oligomer selected from the group consisting of: 1) a polyester polymer, 2) acrylic polymer, 3) polyurethane polymer, and 4)

urethane oligomer derived from a polyisocyanate, each of 1) 2) 3) and 4), when present, containing a plurality of carbamate groups of Structure I selected from the group consisting of terminal groups, pendant groups, and a mixture thereof, and 5) polyurethane polyol containing a plurality of hydroxyl groups selected from the group consisting of terminal, pendant, and terminal and pendant, and optionally carbamate groups of Structure I and mixtures thereof; and (ii) an aminoplast crosslinking agent containing methylol groups, methylol ether groups, or mixtures thereof; and wherein (IIA)(i)(a) and (IIB)(i)(a) is present in the clear film-forming composition in amounts of about 3 to about 40 percent by weight based on the total weight of resin solids in the clear film-forming composition.

5. The multi-component composite coating composition of claim 4 wherein the polyether polymer in the clear film-forming composition has on average up to two of said terminal or pendant carbamate groups per molecule.

6. The multi-component composite coating composition of claim 4 wherein said polyether polymer in the clear film-forming composition has an equivalent weight of from about 140 to about 2500 based on equivalents of said terminal or pendant carbamate groups.

7. The multi-component composite coating composition of claim 4 wherein said aminoplast in the clear film-forming composition is a condensate of melamine with formaldehyde and optionally an alcohol containing from 1 to 4 carbon atoms.

8. The multi-component composite coating composition of claim 4 wherein the equivalent ratio of said pendant and terminal groups to methylol or methylol ether groups in the clear film-forming composition is from 0.5 to about 2:1 and is sufficient to form a crosslinked film.

9. The multi-component composite coating composition of claim 4 wherein the polyether polymer is present in the clear film-forming composition in amounts of about 10 to about 30 percent by weight based on the total weight of resin solids in the clear film-forming composition.

10. The multi-component composite coating composition of claim 4 wherein the aminoplast is present in the clear film-forming composition in amounts of about 15 to about 50 percent based on the total weight of resin solids in the clear film-forming composition.

11. The multi-component composite coating composition of claim 4 wherein component (II)(A)(i)(b) and (II)(B)(i)(b)(1) in the clear film-forming composition is a polyester polymer and is present in the clear film-forming composition in amounts up to about 60 percent by weight based on the total weight of resin solids in the clear film-forming composition.

12. The multi-component composite coating composition of claim 11 wherein the polyester polymer of component (II)(A)(i)(b) and (II)(B)(i)(b)(1) in the clear film-forming composition is derived from a cycloaliphatic acid or anhydride.

13. The multi-component composite coating composition of claim 12 wherein said cycloaliphatic acid or anhydride is selected from the group consisting of hexahydrophthalic acid, hexahydrophthalic anhydride, methylhexahydrophthalic acid, and methylhexahydrophthalic anhydride.

14. The multi-component composite coating composition of claim 4 wherein component (IIA)(i)(b) and (IIB)(i)(b)(2) in the clear film-forming composition is an acrylic polymer and is present in the clear film-forming composition in amounts up to about 50 percent by weight based on the total weight of resin solids in the clear film-forming composition.

15. The multi-component composite coating composition of claim 4 wherein component (II)(A)(i)(b) and (II)(B)(i)(b)(4 and 5) in the clear film-forming composition is an urethane oligomer and polyurethane polyol derived from an isocyanate and is present in the clear film-forming composition in amounts up to about 50 percent by weight based on the total weight of resin solids in the clear film-forming composition.

16. The multi-component composite coating composition of claim 15 wherein said polyurethane, urethane polyol and polyurethane polyol has a number average molecular weight of from about 300 to about 3100 as determined by gel permeation chromatography using a polystyrene standard.

17. The multi-component composite coating composition of claim 15 wherein said polyurethane polyol contains a plurality of terminal hydroxyl groups.

18. The multi-component composite coating composition of claim 17 wherein said polyurethane polyol is a reaction product of butyl ethyl propane diol and an isocyanurate of hexamethylene diisocyanate.

19. The multi-component composite coating composition of claim 15 wherein said polyurethane contains a plurality of terminal carbamate groups of the Structure I.

20. The multi-component composite coating composition of claim 19 wherein said polyurethane is an oligomeric reaction product of hydroxypropyl carbamate and isophorone diisocyanate.

21. The multi-component composite coating composition of claim 4 wherein said composition is suitable for application over a plastic substrate comprising a flexible thermosetting or thermoplastic material.

22. The multi-component composite coating composition of claim 4 which includes an acrylic polymer containing a plurality of amide groups and, optionally, a plurality of terminal, pendant, or terminal and pendant carbamate groups of Structure I and mixtures thereof.

23. The multi-component composite coating composition of claim 4 wherein the acrylic polymer containing a plurality of amide groups is present in the clear film-forming composition in amounts up to about 30 percent by weight based on the total weight of resin solids in the clear film-forming composition.

24. The multi-component composite coating composition of claim 4 wherein the clear film-forming composition further comprises a hydrophilically modified silica.

* * * * *